Aug. 3, 1954  M. G. BEKKER  2,685,481
SPACED LINK TRACK

Filed July 25, 1950  4 Sheets-Sheet 1

INVENTOR.
MIECZYSLAW GREGORY BEKKER
BY
ATTORNEY

Aug. 3, 1954

M. G. BEKKER 2,685,481

SPACED LINK TRACK

Filed July 25, 1950

INVENTOR.
MIECZYSLAW GREGORY BEKKER

BY Bailey, Stephens & Huettig

ATTORNEY

INVENTOR
MIECZYSLAW GREGORY BEKKER
BY
ATTORNEY

Aug. 3, 1954     M. G. BEKKER     2,685,481
SPACED LINK TRACK

Filed July 25, 1950     4 Sheets-Sheet 4

INVENTOR.
MIECZYSLAW GREGORY BEKKER
BY
*Bailey, Stephens & Huettig*
ATTORNEY

Patented Aug. 3, 1954

2,685,481

UNITED STATES PATENT OFFICE 2,685,481

SPACED LINK TRACK

Mieczyslaw Gregory Bekker, Ottawa, Ontario, Canada, assignor to His Majesty the King in the right of Canada as represented by the Minister of National Defence, Ottawa, Ontario, Canada Application July 25, 1950, Serial No. 175,767

3 Claims. (Cl. 305—10)

This invention relates to tracked vehicles and is particularly directed to a novel arrangement of the link constituting the track with the intention of developing a greater tractive effort over varying conditions of terrain by taking advantage of the maximum strength of various conditions of soil.

Tracked vehicles are now well known and find extensive use under conditions where wheeled vehicles tend to sink into the ground or the driving wheels fail to obtain a grip. Industrial and agricultural tractors illustrate one use of tracked vehicles. The development and extensive use of the military tank present problems in design which are of vital importance.

The basic conception of a tracked vehicle involves the use of a continuous belt or track passing over a plurality of wheels, one of which wheels is adapted to engage and drive the track. Considerable work has been done over the years in developing various forms of track links, methods of drive, and methods of hinging the links together, but to discuss the development at the present would not assist in an understanding of the invention but would merely cause confusion.

There are a number of different functions which the track of a tracked vehicle may perform, but in many cases it was necessary for various reasons to adopt a compromise in which it fulfils some of these functions only partially or not at all. The extent to which any particular function is fulfilled will depend to a large extent on factors outside the control of the track designer and in particular on the characteristics of the suspension, such as the number and size of the weight-carrying wheels, the spacing between them, the absorption and wheel deflection permitted by the springs, and generally on the contour of the track. These factors in turn will be determined by the general design of the vehicle and in particular the speed at which it is required to operate on various types of ground, and the extent to which it must be capable of negotiating soft ground, and obstacles of various sorts, referred to generally as its performance. It will, of course, also depend to a very large extent on the type of track adopted, but here again the choice will be largely governed by the performance required. The main functions which a track may fulfil are set out briefly below:

(a) Providing multi-wheel drive from a single axle, i. e. the equivalent of a locomotive coupling rod, to ensure that the whole area of ground on which the weight of the vehicle is supported contributes its quota to the tractive effort i. e. the force which propels the vehicle forward.

(b) Increasing the area of ground upon which a grip is obtained to drive the vehicle forward, so as to increase the tractive effort on certain types of ground.

(c) Distributing the pressure due to the weight of the vehicle over as large an area of ground as possible, so as to keep down the maximum pressure exerted on the ground and prevent the ground being squashed down more than is essential, thereby reducing the rolling resistance, i. e. the force which opposes the movement of the vehicle.

(d) Improving obstacle-crossing performance by providing the equivalent of a ramp for helping the vehicle to mount an obstacle, and by bridging the gap between wheels and thereby preventing individual wheels from dropping too far into trenches and the like.

(e) To produce an even and smooth roller path along which the road wheels can run with the minimum of resistance.

It will be obvious that the links which compose a track must have certain features in common, inasmuch as these features are dictated by the functions which the track has to fulfil. Thus, all links must possess the following:

(a) A surface to rest on the ground to give support, which may provide:

(b) A surface to engage the ground to give adhesion whether by friction or by digging-in and tending to shear the ground.

(c) A wheelpath for the load bearing wheels to run on.

(d) Guiding faces to keep the wheels on the tracks.

(e) Driving surfaces for example on trunnions, openings, or teeth, to take the drive from the sprocket.

(f) A hinge for connecting one link to the next link.

It is clear that the track link must afford a surface on which the upward pressure of the ground can act to support the load. This surface will offer a certain measure of adhesion between the track link and ground even if it is completely flat and in some cases this adhesion has been relied upon as sufficient for normal running.

In other cases the supporting surface has not been completely flat but has had in it various forms of grooves or recesses formed either on purpose to improve adhesion or because the link could not be made otherwise. In particular, if a track link is formed by stamping, it is very much easier to push up projections on its upper surface if resesses are formed in its underface. In the same category with tracks having recesses in their underside it may be mentioned tracks having irregular projections, that is, anything other than a straight bar or spud extending transversely across the track, e. g. a chevron.

The adhesion provided by a flat surface is generally not sufficient in many conditions, and is not much improved by recesses which are liable to become filled with earth. In these cases instead of an inadequate adhesion between soil and track line, a rather insufficient cohesion between soil and soil is developed. In many cases the links have formed on them one or more transverse spuds or grousers to dig into the ground and improve adhesion. The role of the grousers, however, was found to be rather inadequate and, as experience has shown, limited by mechanical inconveniences.

It is an object of this invention to provide a track fulfilling the required functions and the design requirements enumerated above or incorporated and which will develop much greater tractive effort over various types of soil than the prior art track.

It has been found that the conventional track composed of a series of grouser plates hinged closely together has a performance which is not fundamentally affected by the track design. The tractive effort or draw bar pull of such conventional tracks does not basically depend on the design of individual track links. In cohesive soil only the area of contact surface between the track shoes and the soil determines the tractive effort, whereas in frictional soil the weight of the vehicle is solely responsible for the available draw bar pull regardless of the track dimension. In both cases the shape of the individual track link, the dimensions and the spacing of the grousers have a secondary and rather insignificant meaning as far as tractive effort is concerned. This may be explained by the fact that existing grousers which are usually spaced relatively close together merely cause horizontal shearing of the ground and each grouser only has to move the block of earth between itself and the next grouser at a depth not exceeding the grouser depth. Whether slip occurs between the material of the track and the soil, or between two layers of soil, the ratio of the frictional or shearing force to the normal force is known as the adhesion factor. Thus in the case of solid friction between the track and for example concrete road, the coefficient of friction and the adhesion factor are the same thing, and within limits are independent of the area of contact.

Where the track is provided with spuds which dig into the ground it generally follows that slip can only occur if there is some shearing of the upper layer of the ground between the grousers and the adhesion factor in these circumstances will on a cohesive soil be dependent on the area of contact. It is well to bear in mind that both shear and surface friction may be present together, especially on hard ground where the bulk of the weight is carried on the grousers.

The law governing the friction of the kind that arises when a sample of earth is sheared is somewhat similar but not identical to the laws of solid friction, the resemblance varying with the type of soil. In this case the force required to produce shearing per unit area is given by Coulomb's equation, namely:

$$s = p \tan \phi + c$$

where $p$ is the normal pressure, $\phi$ the angle of internal friction and $c$ the cohesion.

Internal friction is primarily associated with granular particles such as sand, whilst cohesion is associated with binders such as clays.

The resistance to shear is directly proportional to the normal pressure. A cohesive material on the other hand can offer a resistance to shear even when there is no normal pressure, in which case the adhesion factor would theoretically be infinite.

It should be noted that the moisture content and the spacing and arrangement of particles of the soil affect its properties and it must be realized that the value of $c$ and $\phi$ are not absolute constants for a given soil but vary with factors such as those mentioned above.

It is known that the stresses in earth which is in a state of plastic flow or shear satisfy Coulomb's equation involve that at every point the surfaces of rupture are inclined to the plane on which acts the major principal stress at angles of $(45° \mp \phi/2)$.

If a vertical hoe blade is driven into the earth and then forced horizontally the major stress in the adjacent ground acts on horizontal planes whence the lines of rupture are theoretically inclined to the vertical at angles of $(45° + \phi/2)$ or to the horizontal at $(45° - \phi/2)$.

Therefore if a vertical blade such as a hoe is driven into the ground and then moved horizontally, the earh will shear approximately in a plane inclined at an angle $(45° - \phi/2)$ to the horizontal where $\phi$ is the angle of internal friction. This angle of rupture is independent of the cohesion of the soil and also of any surcharge.

Consequently the soil slide is substantially a wedge-shaped block pushed by the action of the hoe blade if the soil located in this block is allowed to move freely upwards.

The conventional track link employing a grouser or spud fails to develop the maximum tractive effort because the adjacent links disturb and do not allow the free movement of the wedge-shaped soil block. Accordingly the present invention is directed to a spaced link track in which approximately L-shaped links are used and in which the links are spaced sufficiently far apart to permit the soil to fully shear in a wedge-shaped manner described above between each of the links.

In the accompanying drawings practical examples of the invention are disclosed.

Figure 1:
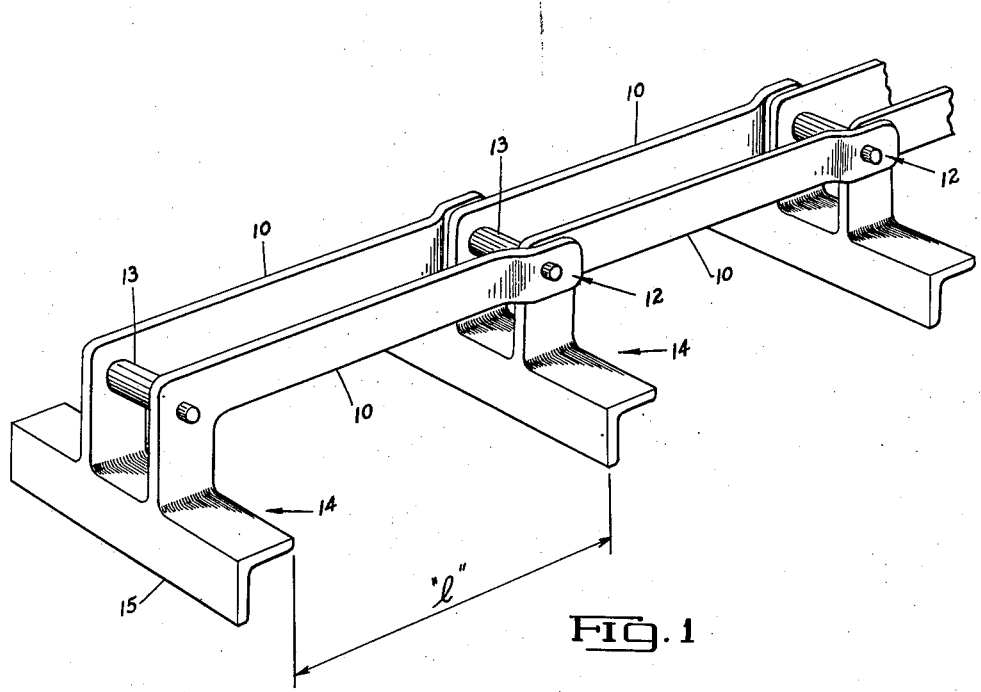
Figure 1 is a perspective view of the new track.
Figure 3:
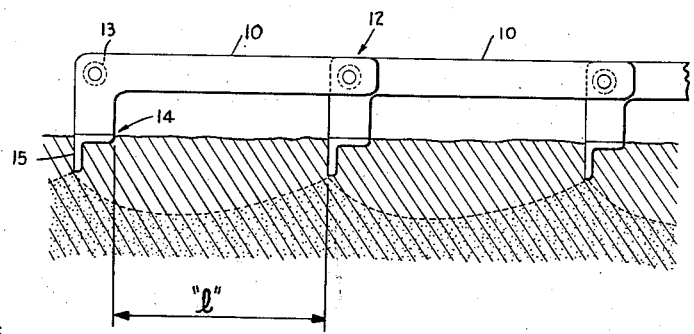
Figure 3 is a plan view of the new track in engagement with the ground and sectioned to show the action of the grousers.
Figure 2:
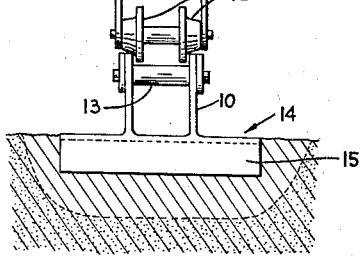
Figure 2 is an end view showing one link of the track in engagement with the ground.

Referring now to Figure 1 three links of the proposed track are illustrated and it will be seen that each link is composed of an upper structure 10 which forms a chain or track articulated at 12 by bolts or pins 13. The bolts or pins 13 may be of any conventional design known to those skilled in the art. Track link 14 fitted with grousers or spuds 15 of generally L shape are secured to the track 10 and spaced apart a distance $l$ shown by the arrow in Figures 1 and 3.

It will be noted that the chain links 10 formed by the uper structure of the track are so shaped that the soil portion extending between the adjacent links is possibly not loaded at all by any portion of the vehicle weight.

The links or track 10 may also serve as rails for supporting the bogie or idling wheels 16 of the vehicle in the same manner as done in conventional tracked vehicles. These rails may be adapted for any required number of rows of bogie wheels.

The distance $l$ between individual links 14 evaluated to the following approximate formula:

$$l = \frac{s\epsilon^{\left[\frac{270-2\theta-\phi}{114.6}\cdot\tan\phi\right]}\cdot\left(\cos\theta+\frac{h}{s}\sin\theta\right)}{\sqrt{2}\left(\cos\frac{\phi}{2}-\sin\frac{\phi}{2}\right)}$$

where $s$ is the length of the link plate, $\epsilon$ is the Naperian base 2.718, $h$ is the depth of the spud, $\phi$ is the angle of internal friction of soil. $\theta$ is the angle at which the ground bearing capacity, equal to the geometrical sum of the safe vertical load V, and of the horizontal load H, is sloped to the perpendicular.

The safe soil loads V and H are those exercised by vehicle weight and by the tractive efforts respectively without involving soil failure. These loads may be expressed approximately by the formulae having the following structure:

$$H=(spc+s^2n\gamma)\sin\theta$$
$$V=(spc+s^2n\gamma)\cos\theta$$

where $p$ and $n$ are pure numbers depending on the ratio of dimensions $h$ and $s$, as well as on soil friction and as appear, for example, in the methods and formulas for obtaining bearing factors in "Theoretical Soil Mechanics" by K. Terzaghi. The values for the various elements of the formula can either be determined experimentally, or obtained from standard works in soil mechanics such as the publication "Theoretical Soil Mechanics" by Terzaghi. Angle $\phi$ is expressed in degrees; angle $\theta$ in degrees or radians is the angle between V and $\sqrt{H^2+V^2}$ wherein H and V are in pounds per square foot; $c$ is the coefficient of expansion in pounds per square inch; and $\gamma$ is the specific weight of the soil in pounds per cubic inch.

The length $l$ as expressed by the above quoted formula also may be determined experimentally by means of a testing apparatus by measuring the distances at which soil breaks after somewhat larger loads H and V than those safe ones have been applied in conformity with the vehicle weight and with the required tractive effort.

Figure 4:
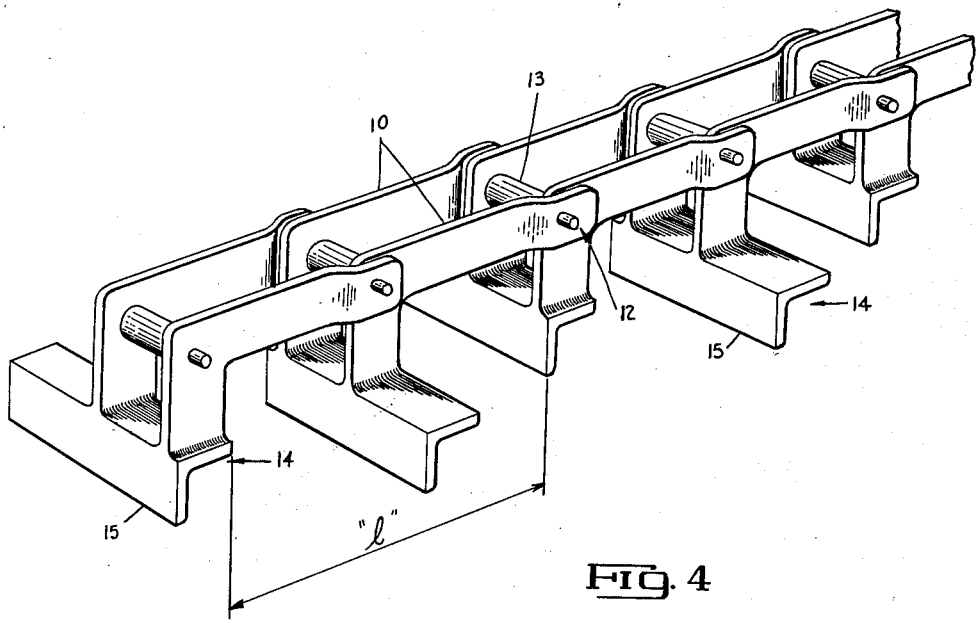
Figure 4 is a further embodiment of the invention wherein the individual links are staggered on each side of the track.

It has been stated above that the spuds or grousers should be generally L-shaped and it has been found that good results are obtained when both flanges are of equal length. In the example shown in Figure 1 the link consists of one unit of sufficient length to give adequate bearing surface and a free soil surface as required by the soil movement. In some cases it may be found that this length of a link is too great for efficient operation of the vehicle in which case a staggered form of track as shown in Figure 4 may be used where half links are employed extending alternately from each side of the track. By adopting this alternate embodiment of the invention the pitch of the track is shortened without departing from the basic concept of this invention of basing the length a sufficient distance to permit a wedge-shaped shear zone to be created and having no load upon this section.

Figure 8:
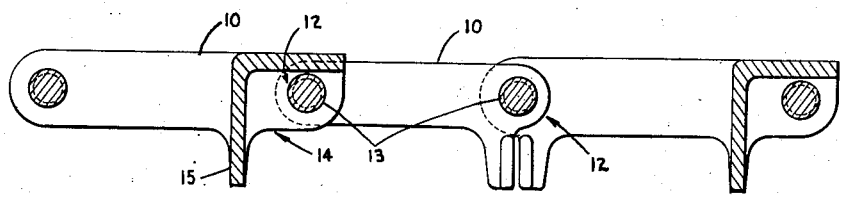
Figure 8 shows the invention applied to a partially girderized track.

The shortening of the track pitch without disturbing the positioning of the rails and bogie wheels may also be achieved by the partial girderization of the track. In Figure 8 every second link hinge is shown girderized i. e. it cannot bend upwards but is able to wrap around the idlers and sprocket. Such partial girderization permits the use of a shorter track pitch and provides adequate support for the running gear without incurring excessive bending moments in the girderized links.

Figure 9:
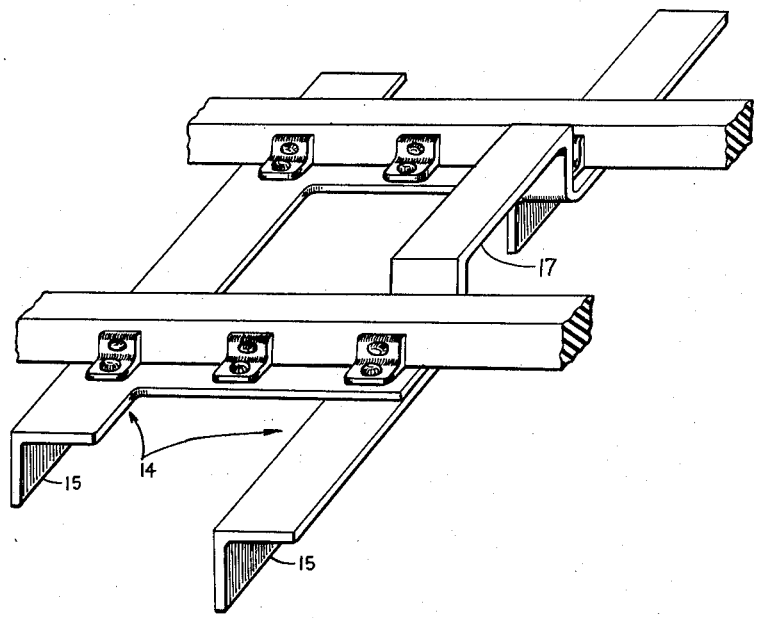
Figure 9 illustrates a further embodiment of the invention in which a continuous rubber belt is employed.

In Figure 9 a track is disclosed in which the links are mounted on a continuous belt made of flexible material such as rubber.

Figure 5:
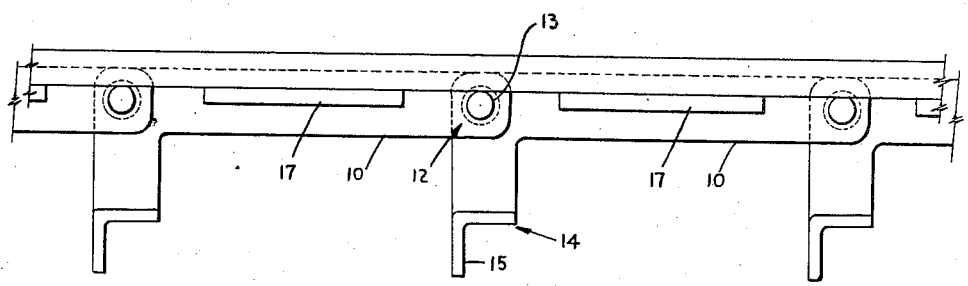
Figure 5 illustrates an embodiment of the invention in which a supplementary track is employed.

An essential embodiment of the invention is disclosed in Figure 5 in which the gaps between the links are covered by an enclosing member 17. The member 17 is positioned some distance above the track links and may take either the form of a light belt or a more rigid structure such as the form of track link disclosed in Figure 9 where the link is of stepped construction having an upper flange extending over practically all the distance between the two links. In this form of the invention the members 17 act to give a better flotation in extremely soft soil and in snow. An advantage of this embodiment of the invention is that the track would be self-cleaning in nature and thus increase the general efficiency of the track. In an exceedingly soft terrain the lateral surfaces of soil shear would be increased by the height at which the upper flange is located above the main track links and thus more advantage taken of more cohesive forces. The upper member 17 could also be in the form of a continuous lightweight rubber belt arranged to be moved in synchronism with the track.

Figure 6:
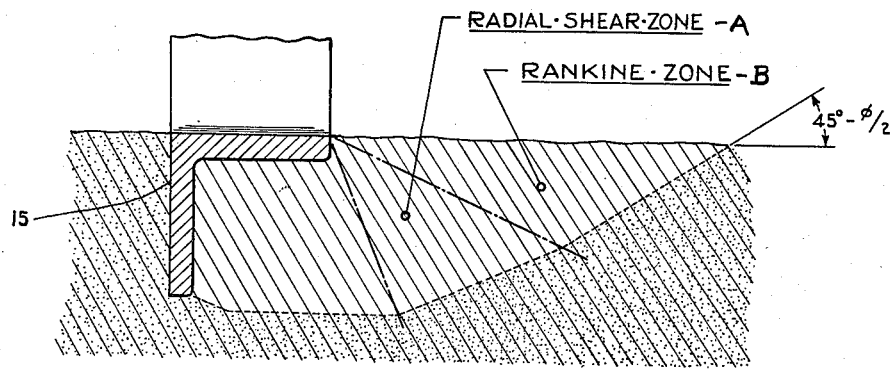
Figure 6 is a diagram illustrating the movement of soil as a result of applied forces.

Figure 6 illustrates the refined theory of the wedge shearing of soils under plastic flow and it will be noted that there is a zone A the bottom portion of which is curved and a zone B. The zone A might be defined according to accepted theories of soil mechanics as the zone of radial shear and the zone B as the Rankine zone. The distance $l$ between links should cover to the length of the radial zone and the Rankine zone though in some cases less efficient operation may be secured where the distance $l$ is shorter.

The spaced link track of this invention is particularly useful when applied to tractors, cargo carrying vehicles or armoured vehicles and will increase its performance due to the ability of obtaining higher values of tractive effort which are unobtainable with conventional tracks. In tests carried out at a military proving grounds in cohesionless sand with a light cargo vehicle it has been found that a tractive effort equal to 118% of the vehicle weight was obtained, whereas the best known results with a similar vehicle employing conventional track was between 60 and 70% of the weight of the vehicle. Employing conventional track the only way that the tractive effort could be increased would be to increase the vehicle weight with the accompanying disadvantages.

The greater tractive effort obtained with vehicles using the new track will materially improve the steering characteristics of tracked vehicles by increasing the available steering moment. Heretofore, the ratio of length to width of the tracked vehicle was always very small in order to achieve proper steering. The vehicle width being limited by traffic considerations, the length has, consequently, always been relatively short. It has been found with vehicles using the track of this invention that steering was quite satisfactory despite lengthening the vehicle by 20% above the conventional standards. The above may be explained by the fact that in this particular case the available steering moment was increased almost 100%. This advantage alters one of the restrictions previously encountered in the design of tracked vehicles and also improves the load bearing characteristics of the vehicle.

It is obvious that on a hard ground (paved roads) where the action of a spaced link track is identical with the action of any conventional track, i. e. when the tractive effort equals weight times coefficient of friction, only the above discussed steering advantage is non-existent. In this case a too long vehicle despite being equipped with a spaced link track would not steer.

Figure 10:
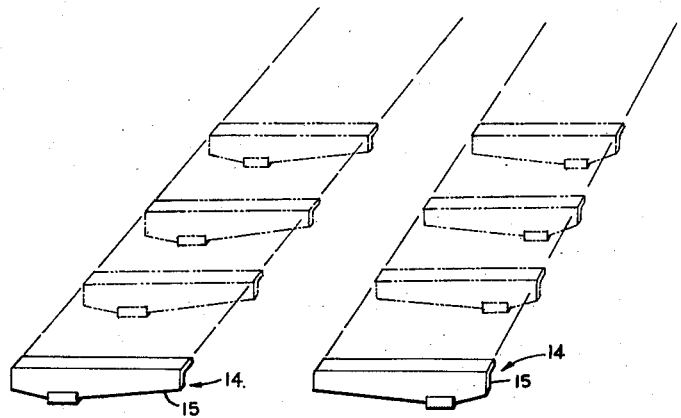
Figure 10 illustrates the asymmetric location of track supporting members for use on hard road surfaces.

In order to offset such a disadvantage, an assymetric location of rubber pads, or steel spuds which support the tracks on a hard surface may be provided. This solution is shown in Figure 10 where the length/width ratio of ground contact area is adequate for steering purposes, since the track supports have been offset toward the outer side of the track links.

As the weight of the vehicle employing the new track is not as critical in developing tractive effort as in conventional vehicles lighter vehicles can be built which is a distinct advantage in the use of airborne equipment which is to be dropped to advance fighting troops.

Figure 7:
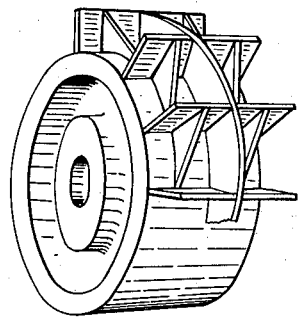
Figure 7 illustrates a modification of the invention as applied to a wheel.

In the examples of the invention described above the invention has been applied to continuous tracked vehicles but it is within the scope of this invention as illustrated in Figure 7 to space spuds or grousers on rotary wheels or ordinary wheeled vehicles in a similar manner to the spacing of the spuds or grousers on a continuous track. In the example of the invention illustrated in Figure 7 one modification has been shown but it is within the scope of the invention to utilize various arrangements of spuds or grousers in order to meet various soil conditions providing that the space distance between the grousers is within the invention as described above.

I claim:

1. In a continuous track for vehicles having a plurality of connected links, and grousers joined to said links, the improvement comprising grousers each composed of a ground surface engaging flange and a ground penetrating flange, the ground surface engaging flange of each grouser being separated by a clear space from the similar flanges of adjacent grousers, said space being a distance $l$ between the free edge of a surface engaging flange and the penetrating flange of an adjacent grouser according to the formula:

$$l = \frac{s\epsilon^{\left[\frac{270-2\theta-\phi}{114.6} \cdot \tan \phi\right]} \cdot \left(\cos \theta + \frac{h}{s} \sin \theta\right)}{\sqrt{2}\left(\cos \frac{\phi}{2} - \sin \frac{\phi}{2}\right)}$$

where $s$ is the width of the ground surface engaging flange, $\epsilon$ is the Naperian base 2.718, $h$ is the height of the ground penetrating flange, $\phi$ is the angle of the internal friction of the soil, and $\theta$ is the angle at which the ground bearing capacity is sloped to the perpendicular.

2. In a continuous track as in claim 1, each of said links comprising a horizontal portion and a depending vertical portion, and said grousers being secured to the lower free ends of said vertical portion whereby said horizontal portion is positioned out of contact with the surface of the ground.

3. In a continuous track as in claim 1 further comprising grousers each of which has a ground penetrating flange the lower edge of which is inclined from a point adjacent the outer side of the link towards the two side edges of said grouser, whereby reducing steering resistance of said track on hard ground.

References Cited in the file of this patent

UNITED STATES PATENTS

| Number | Name | Date |
|---|---|---|
| 1,139,009 | Allen | May 11, 1915 |
| 1,260,259 | Fish | Mar. 19, 1918 |
| 1,273,777 | Hansen | July 23, 1918 |
| 1,398,890 | Coatsworth | Nov. 29, 1921 |
| 2,487,813 | Knox | Nov. 15, 1949 |

FOREIGN PATENTS

| Number | Country | Date |
|---|---|---|
| 256,366 | Italy | Dec. 22, 1927 |
| 48,136 | Netherlands | Apr. 15, 1940 |